UNITED STATES PATENT OFFICE.

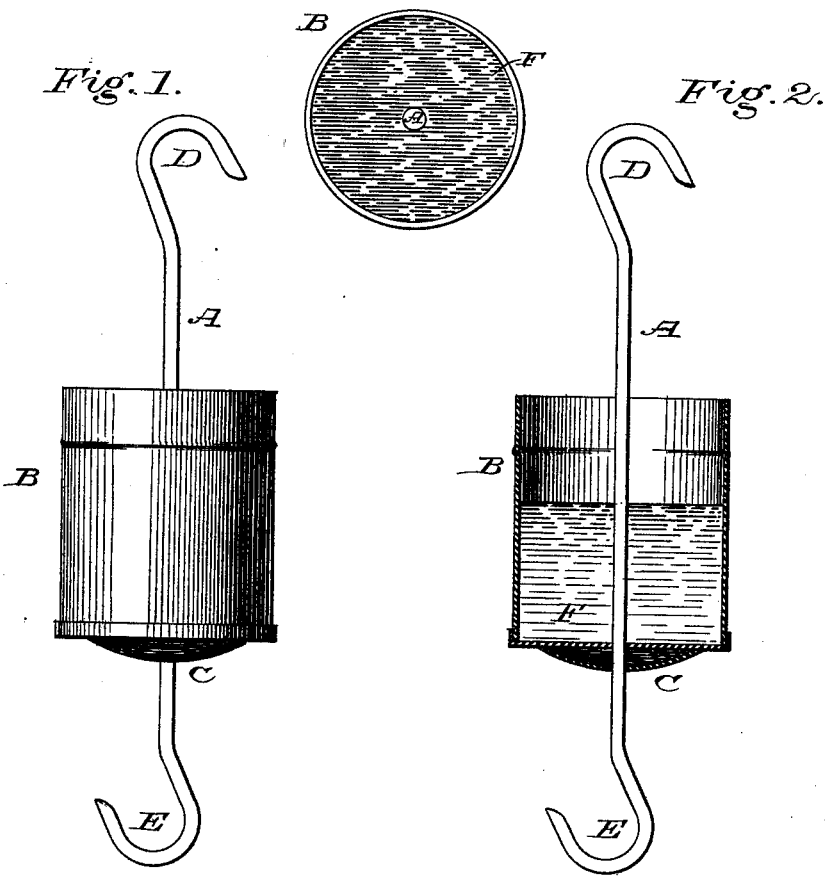

SANFORD MASON, OF GALVESTON, TEXAS.

IMPROVEMENT IN HOOKS FOR SUSPENDING MEAT.

Specification forming part of Letters Patent No. 214,162, dated April 8, 1879; application filed October 31, 1878.

*To all whom it may concern:*

Be it known that I, SANFORD MASON, of the city and county of Galveston, State of Texas, have invented a new and useful improved device and mode for preventing ants and other insects from approaching meat and other articles of food; and I do hereby declare that the following is a full and exact description of the same, reference being had to the accompanying drawings, and to the letters of reference marked thereon.

Figure 1 is a side elevation. Fig. 2 is a vertical longitudinal section. Fig. 3 is a vertical cross-section.

In all the figures like letters refer to like parts, and in said figures the main rod is indicated by the letter A, and the water or fluid cup, which holds the water or other fluid in position around the main rod A, by B.

In the arrangement of Fig. 1 and Fig. 2 the main rod A and the water or fluid cup B are combined and connected at letter C, for the purpose of holding the water or fluid around the main rod A.

D indicates the upper hook of main rod A, and E indicates the lower hook of main rod A, and F on the dotted lines indicates water or other fluid held in the water or fluid cup and around the main rod A.

The apparatus, when being used, is suspended from the ceiling or any convenient place by the upper hook, indicated by the letter D. The water or fluid cup is partially filled with water or other fluid, as indicated by letter F in Figs. 2 and 3. The meat or other articles of food is suspended from the lower hook, indicated by letter E. When ants go down the main rod A they are arrested and successfully barred from approaching the meat or other articles of food by the water or fluid held in the fluid-cup and around the main rod A.

Having thus described the nature, construction, and mode of using my improved ant-arrester, what I claim as my invention, and desire to secure by Letters Patent, is—

The combination and connection of the main rod A with the water or fluid cup B, substantially for the purpose as herein described.

SANFORD MASON.

Witnesses:
JOHN MOSER,
MAX HAUSSLER.